United States Patent
Heliin (10) Patent No.: US 11,126,161 B2
(45) Date of Patent: Sep. 21, 2021

(54) USING IMAGE ANALYSIS TO GENERATE AN AUTOMOBILE SURFACE PROTECTING DEVICE ATTACHED WITH AN ADHESIVE

(71) Applicant: Premier Protection Holdings, LLC, Salt Lake City, UT (US)

(72) Inventor: Christopher L. Heliin, West Jordan, UT (US)

(73) Assignee: Premier Protection Holdings, LLC, Salt Lake City, UT (US)

(*) Notice: Subject to any disclaimer, the term of this patent is extended or adjusted under 35 U.S.C. 154(b) by 0 days.

(21) Appl. No.: 17/103,867

(22) Filed: Nov. 24, 2020

(65) Prior Publication Data

US 2021/0191361 A1 Jun. 24, 2021

Related U.S. Application Data

(63) Continuation of application No. 14/201,252, filed on Mar. 7, 2014, now abandoned.

(60) Provisional application No. 61/792,426, filed on Mar. 15, 2013, provisional application No. 61/909,237, filed on Nov. 26, 2013.

(51) Int. Cl.
| | |
|---|---|
| *G05B 19/4099* | (2006.01) |
| *G06T 7/521* | (2017.01) |
| *G06T 17/00* | (2006.01) |
| *G06T 7/13* | (2017.01) |

(52) U.S. Cl.
CPC .......... *G05B 19/4099* (2013.01); *G06T 7/13* (2017.01); *G06T 7/521* (2017.01); *G06T 17/00* (2013.01); *G05B 2219/35134* (2013.01); *G05B 2219/45183* (2013.01); *G06T 2207/30156* (2013.01)

(58) Field of Classification Search
CPC ..... G06F 30/00; G06T 19/00; G06T 2215/16; G06T 2219/021
See application file for complete search history.

(56) References Cited

U.S. PATENT DOCUMENTS

| 4,251,572 A | 2/1981 | Herliczek et al. |
| 4,279,513 A | 7/1981 | Tucker |
| (Continued) | | |

OTHER PUBLICATIONS

"CAD Forum—Unfold any 3D mesh into 2D planar form", waybackmachine www.cadforum.cz, Mar. 2012, pp. 1-3.

(Continued)

*Primary Examiner* — Guillermo M Rivera-Martinez (74) *Attorney, Agent, or Firm* — Kunzler Bean & Adamson (57) ABSTRACT

A method and system for using image analysis to generate an automobile surface protecting device attached with an adhesive are provided. The method includes generating from a scanned three-dimensional image, using one or more image analysis applications, a protective film template for a vehicle panel based on the dimensions of the vehicle panel, a determined transition point, a determined termination point, and a plurality of relief cuts. Generating the protective film template includes converting a three-dimensional protective film template into a two-dimensional protective film template by flattening the protective film template. The method includes transferring the protective film template to the sheet of protective film. The sheet of protective film includes an adhesive and is used to modify an appearance of the vehicle panel by modifying how light reflects off scratches on the vehicle panel.

20 Claims, 9 Drawing Sheets

(56) References Cited

U.S. PATENT DOCUMENTS

| | | | |
|---|---|---|---|
| 4,554,635 | A | 11/1985 | Levin |
| RE35,318 | E | 8/1996 | Warman |
| 5,873,975 | A | 2/1999 | Benoit |
| 6,250,765 | B1 | 6/2001 | Murakami |
| 6,613,411 | B2 | 9/2003 | Kollaja et al. |
| 6,634,695 | B2 | 10/2003 | Campfield et al. |
| 7,132,142 | B2 | 11/2006 | Truog et al. |
| 7,141,133 | B2 | 11/2006 | Kesti et al. |
| 7,529,364 | B2 | 5/2009 | Buehler |
| 7,784,610 | B2 | 8/2010 | Mason |
| 7,883,777 | B2 | 2/2011 | Garware et al. |
| 7,897,228 | B2 | 3/2011 | Steinhardt et al. |
| 7,957,524 | B2 | 6/2011 | Chipping |
| 7,992,917 | B2 | 8/2011 | McCormick et al. |
| 8,044,942 | B1 | 10/2011 | Leonhard et al. |
| 2002/0099524 | A1 | 7/2002 | Sell et al. |
| 2003/0228484 | A1 | 12/2003 | Finley et al. |
| 2006/0222801 | A1 | 10/2006 | Mase |
| 2007/0240548 | A1* | 10/2007 | Pape ........................ B26D 5/00 83/76.1 |
| 2008/0286576 | A1 | 11/2008 | McGuire, Jr. |
| 2010/0028666 | A1* | 2/2010 | Logan ..................... B32B 27/08 428/339 |
| 2010/0270189 | A1 | 10/2010 | Pedersen, II et al. |
| 2014/0278277 | A1* | 9/2014 | Heliin .................... B26D 5/007 703/1 |

OTHER PUBLICATIONS

"Clear Bra Kits", www.clearbra-kits.com, 2012, pp. 1-5.

W. Diem, "More vehicles using laminated windows", Chicago Tribune, Feb. 6, 2003, pp. 1-8.

S. J. Gaffey, "Spectral reflectance of carbonate minerals in the visible and near infrared (0.35-2.55 microns): calcite, aragonite, and dolomite", American Mineralogist, vol. 71, 1986, pp. 151-162.

Instructables, "How to wrap you interior trim with 3M carbon fiber vinyl", Waybackmachine, www.instructables.com, Jul. 2012, pp. 1-4.

Invisible Mask, "The clear solution for paint protection—InvisibleMask", waybackmachine, www.invisiblemask.com, Nov. 2012, pp. 1-4.

A. Kus, "Implementation of 3D Optical Scanning Technology of Automotive Applications", Sensors, Mar. 17, 2009, pp. 1-13.

Laser Scanning Forum "3D scan of Classic Car", Feb. 28, 2010, pp. 1-2.

Innovmetric Software, "PolyWorks V10 Beginner's Guide", Feb. 2007, pp. 1-121.

"Reverse Engineering an Industrial Perspective", Springer Series in Advanced Manufacturing, 2008, pp. 1-259.

S. Son et al., "Automated Laser Scanning System for Reverse Engineering and Inspection", International Journal of Machine Tools & Manufacture, 42, Mar. 6, 2002, pp. 889-897.

Suntek, "SunTek Window Films Releases TruCut Software with Paint Protection and Window Film Patterns—California Distribution Center Now Open", Commonwealth Laminating & Coating, Inc., Aug. 1, 2012, pp. 1-25.

M.J, Wachowiak et al., "3D Scanning and Replication for Museum and Cultural Heritage Applications", JAIC, 2009, pp. 141-158.

Weathertech, "Behind the Tech", waybackmachine, Weathertech. com, Oct. 5, 2012, pp. 1-4.

Wikipedia, "Windshield", Feb. 28, 2013, pp. 1-3.

\* cited by examiner

USING IMAGE ANALYSIS TO GENERATE AN AUTOMOBILE SURFACE PROTECTING DEVICE ATTACHED WITH AN ADHESIVE

FIELD

The subject matter disclosed herein relates to automobiles and more particularly relates to using image analysis to generate an automobile surface protecting device attached with an adhesive.

BACKGROUND

Vehicles continue to improve in efficiency and lifespan. The phrase "lifespan" encompasses the maximum service life of the vehicle as compared to the expense of replacing/repairing components of the vehicle to the value of the vehicle. In other words, the economic tradeoff of service vs. repair often determines the lifespan of the vehicle. Some factors that relate to lifespan/longevity are frequency of oil changes, maintenance schedules, tune-up schedules, monitoring rust, etc.

In the 1960s and 1970s, the expected lifespan of a vehicle was approximately 100,000 miles. Currently, many vehicles have an expected lifespan of up to 200,000 miles due to manufacturing improvements and better anti-corrosion coatings. Over such a long life, a vehicle may experience many types of collisions. These collisions may be minor, such as with a shopping cart, or with a foreign object such as road debris. The collisions, such as with a rock, are a continual source of damage to paint and windshields. Collisions may also occur in the interior space of the vehicle. For example, sharp fingernails may damage buttons or other interior surfaces.

BRIEF SUMMARY

A method and system for generating protective film templates for vehicles are disclosed. The method includes receiving dimensions of a first vehicle panel and an adjacent second vehicle panel, identifying a boundary between the first vehicle panel and the second vehicle panel, determining a transition point between a substantially planar surface and an edge of the first vehicle panel, generating a protective film template for the first vehicle panel based on the dimensions of the first vehicle panel and the determined transition point, and transferring the protective film template to a sheet of protective film. The system includes components for implementing the method. The system includes components configured for implementing the method.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
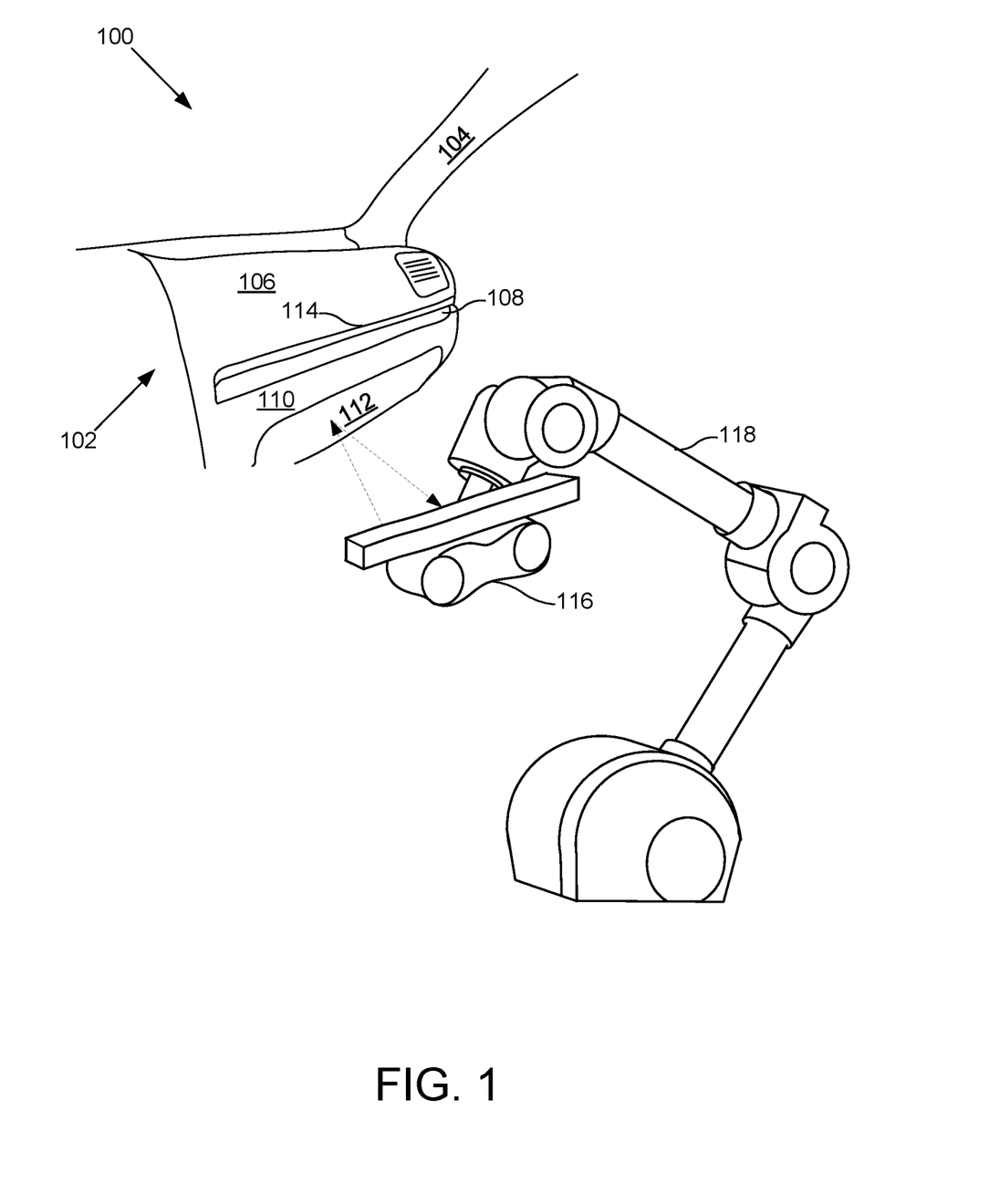
FIG. 1 is a perspective view diagram illustrating one embodiment of a partial car interior.

FIG. 1 is a perspective view diagram illustrating one embodiment of a partial car interior 100. In the depicted embodiment, the partial car interior 100 includes a dash 102 connected with an A pillar 104 of a vehicle. The dash 102 is formed of many different panels 106, 108, 110, 112. Each of the panels 106-112 may be formed of different materials including, but not limited to, plastic, metal, wood, or a combination of materials. Boundaries, such as the depicted boundary 114, are formed when one of the panels is positioned adjacent another of the panels. The boundary 114 may be linear, or curved depending upon a perimeter profile of the panels 106-112.

Each of the panels 106-112 may be covered by a protective film, depicted in greater detail below with reference to FIGS. 3a, 3b, and 3c. The protective film, in one embodiment, is formed of a polyurethane film.

The protective film is selected to provide protection from scratches and other damage caused by passengers in the vehicle and for the aesthetic look of the protective and or non-protective film. Additionally, the protective film functions to minimize the appearance of scratches in the panels 106-112. The protective film minimizes the appearance of scratches in the panels by modifying how light reflects from the sharp edges of a scratch. Therefore, the protective film is useful for refurbishing the vehicle to a condition that is acceptable for pre-owned certification. The protective film is selected having an opacity and a thickness to accomplish the above objectives. In one embodiment, the thickness is in the range of between about 0.001" and 0.1". The opacity of the film is, in one embodiment, transparent. In an alternative embodiment, the protective film is shaded with a color intended to modify the appearance of the panels 106-112. The color may be selected to match a particular desired color scheme, or alternatively, to make a particular panel appear to be a different color or display a logo, design feature or decal of any kind that may be desired. For example, the color or color scheme may be selected to replicate a wood grain, or carbon fiber finish.

The protective film may be selected with a particular "tackiness," to adhere to different surfaces. The term "tackiness" or "tack" may refer to the strength of adhesion of the protective film to a surface. In one embodiment, a protective film is selected with a high strength or tack to adhere the protective film to an exterior surface. A protective film with a lower adhesive strength may be selected for interior surfaces, and further, and even lower adhesive strength for surfaces like navigation or touch screen surfaces.

In one embodiment, a 3d scanner 116 is configured to scan the interior 100 of the vehicle. The 3d scanner 116 analyzes the panels 106-112 to determine dimensions, boundary 114 locations, and surface profiles of the panels 106-112. The 3d scanner 116 collects data on the shapes and dimensions of the panels 106-112 to construct a three dimensional model. The 3d scanner 116 may be implemented using, but not limited to, contact or contactless modeling. For example, the 3d scanner 116 may implement a tapping motion provided by a robotic arm 118. The robotic arm 118 may implement a type of "tapping" motion on the surface of the vehicle interior, at a frequency of between 10 and 500 Hz, to determine a surface profile of the panels 106-112. The position of the robotic arm 118, including rotation and hinge angles, may be included in calculations to determine the surface profile of the panels 106-112.

Figure 2A:
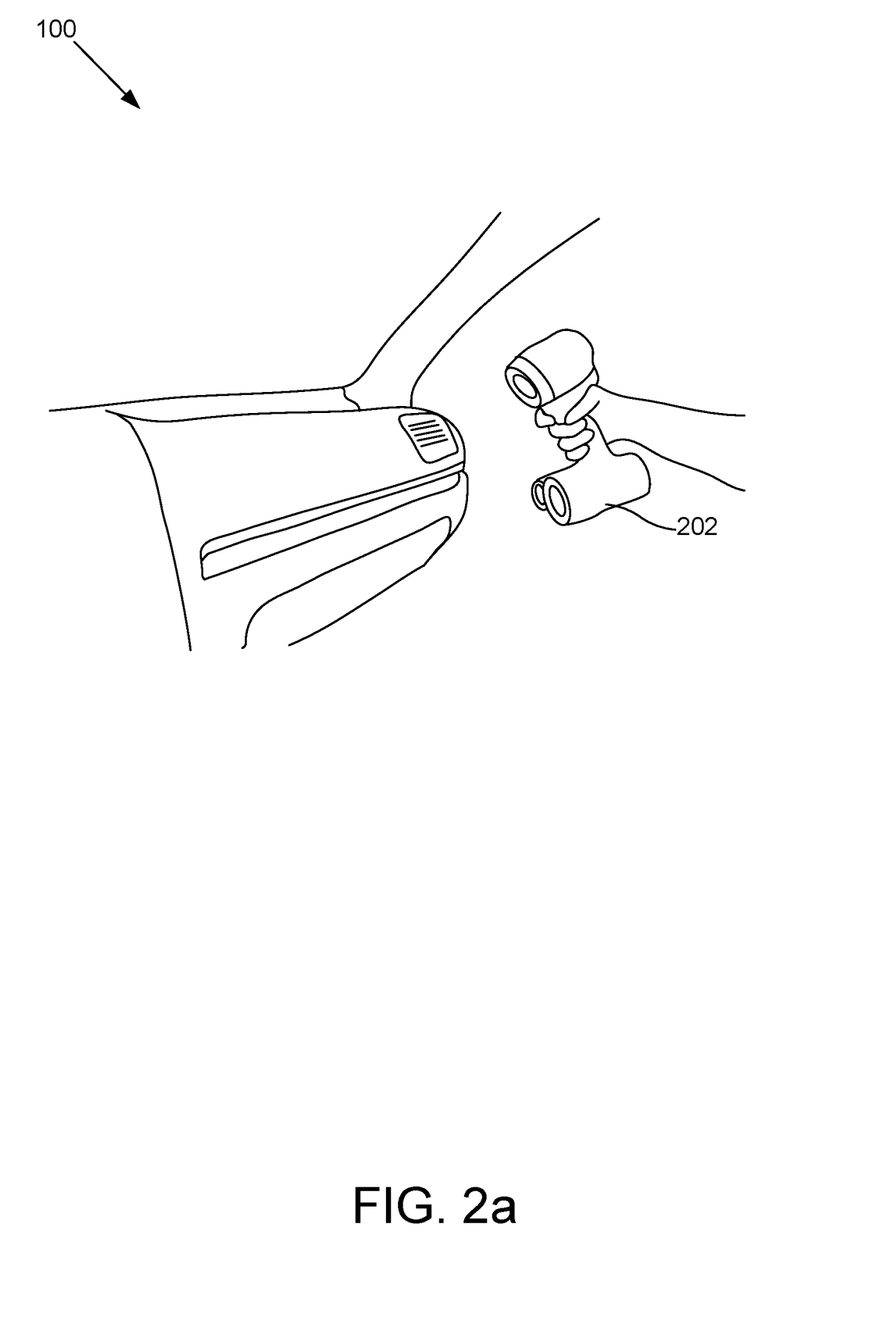
FIG. 2a is a perspective view diagram illustrating another embodiment of a partial car interior in accordance with the present disclosure.

In another embodiment, various types of contactless scanning (either passive or active) may be implemented. These types include, but are not limited to, photogramic scanning, areal scanning, terrestrial scanning, mobile scanning, time-of-flight (Lidar) scanning, triangulation scanning, conoscopic holography, structured and non-structured light scanning, modulated light scanning, stereoscopic scanning, photometric scanning, silhouette scanning, and hand-held 3d scanning (described in greater detail below with reference to FIG. 2.

The 3d scanner 116, in one embodiment, uses the collected data to reconstruct a solid surface. The solid surface may be a polygon mesh model where a curved surface is modeled as many small faceted flat surfaces. In another example, the 3d scanner 116 generates a quilt of curved surface patches to model the panels 106-112. Other solid surface models, as known to those of skill in the art, may be implemented to generate a model or template of the panels 106-112.

FIG. 2a is a perspective view diagram illustrating another embodiment of a partial car interior 100 in accordance with the present disclosure. The depicted embodiment illustrates one example of a hand-held 3d scanner ("hereinafter scanner") 202 capable of scanning the interior of the vehicle. In one embodiment, the scanner 202 creates a 3D image of the panels 106-112 through the triangulation method. Briefly, the scanner 202 uses the triangulation method by projecting a laser dot or line onto a surface of the panels 106-112 and a sensor of the scanner 202 (e.g., a charge-coupled device or position sensitive device) measures the distance to the surface.

In one embodiment, the hand-held 3d scanner is an Artec Eva laser scanner available from Artec Corporation of Luxembourg. In order to get proper reflectivity, a dust or powder, dots or marks from a writing or marking instrument, or other suitable reflective material may be applied to the panels prior to scanning. Additionally, multiple scans may be taken, and software used to combine the scans.

Data is collected in relation to an internal coordinate system of the scanner 202, and therefore to collect data the position of the scanner 202 must be determined. The position can be determined by the scanner 202 using reference features on the dash. In one embodiment, the scanner 202 uses adhesive reflective tabs. Alternatively, the scanner 202 is configured to identify features such as buttons as reference points. External tracking of the position of the scanner 202 may be provided by a laser tracker (to provide the sensor position) together with an integrated camera (to determine the orientation of the scanner), or a photogrammetric solution using 3 or more cameras providing the complete six degrees of freedom of the scanner.

Figure 2B:
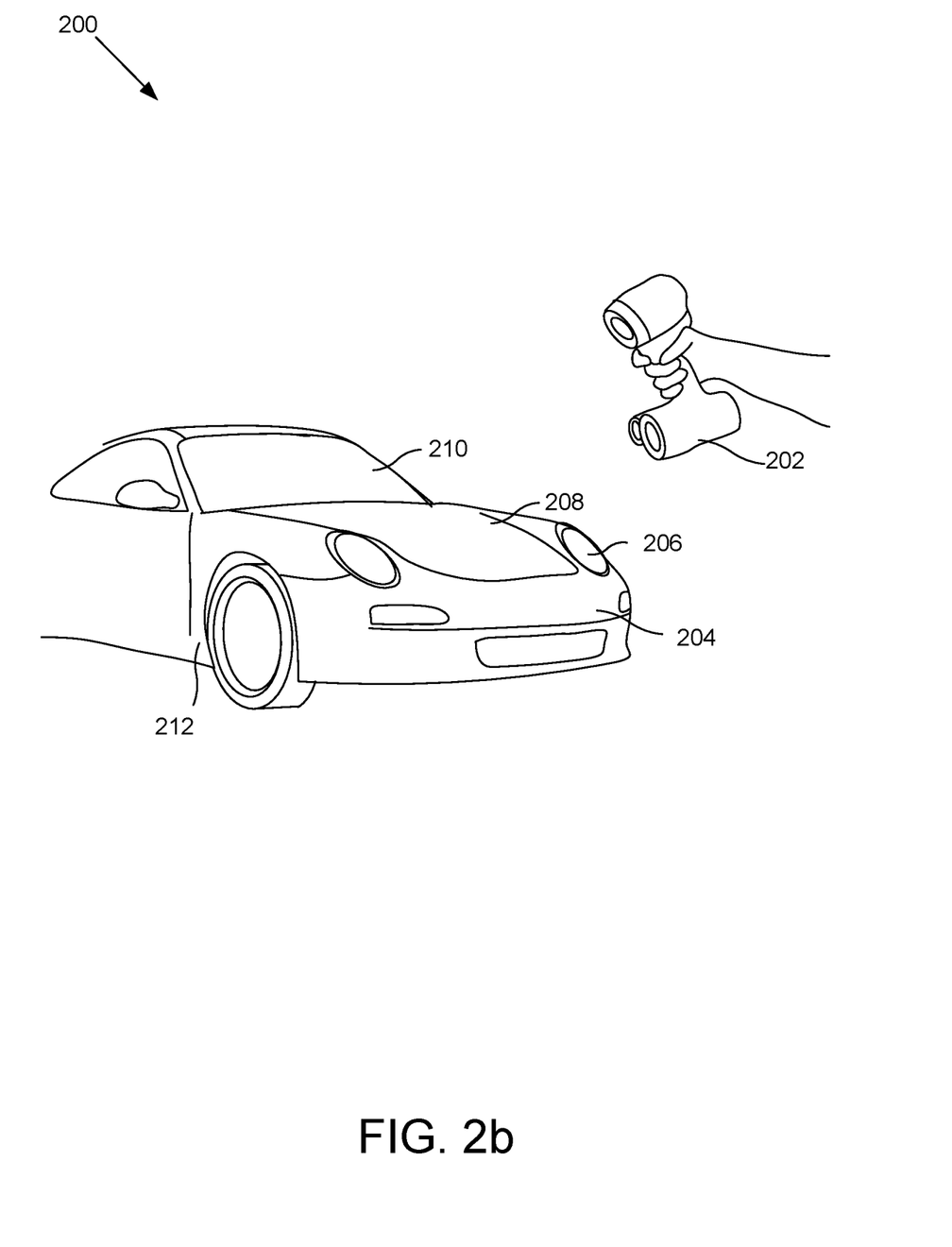
FIG. 2b is a perspective view diagram illustrating another embodiment of the present invention.

FIG. 2b is a perspective view diagram illustrating another embodiment of the present invention. Shown in FIG. 2b is a portion of a car exterior 200. The exterior 200 as depicted includes a bumper 204, a headlight 206, a hood 208, a windshield 210, and a side panel 212. As discussed for the interiors above, the various panels and body parts are scanned with one of the described scanning methods. The described protective layer or film may be applied to any one of the exterior surfaces. As will be described below, the scanner 202 is configured to determine dimensions, boundary locations, and surface profiles of the exterior elements of the vehicle 200. The 3d scanner collects data on the shapes and dimensions of the exterior elements to construct a three dimensional model.

Figure 2C:
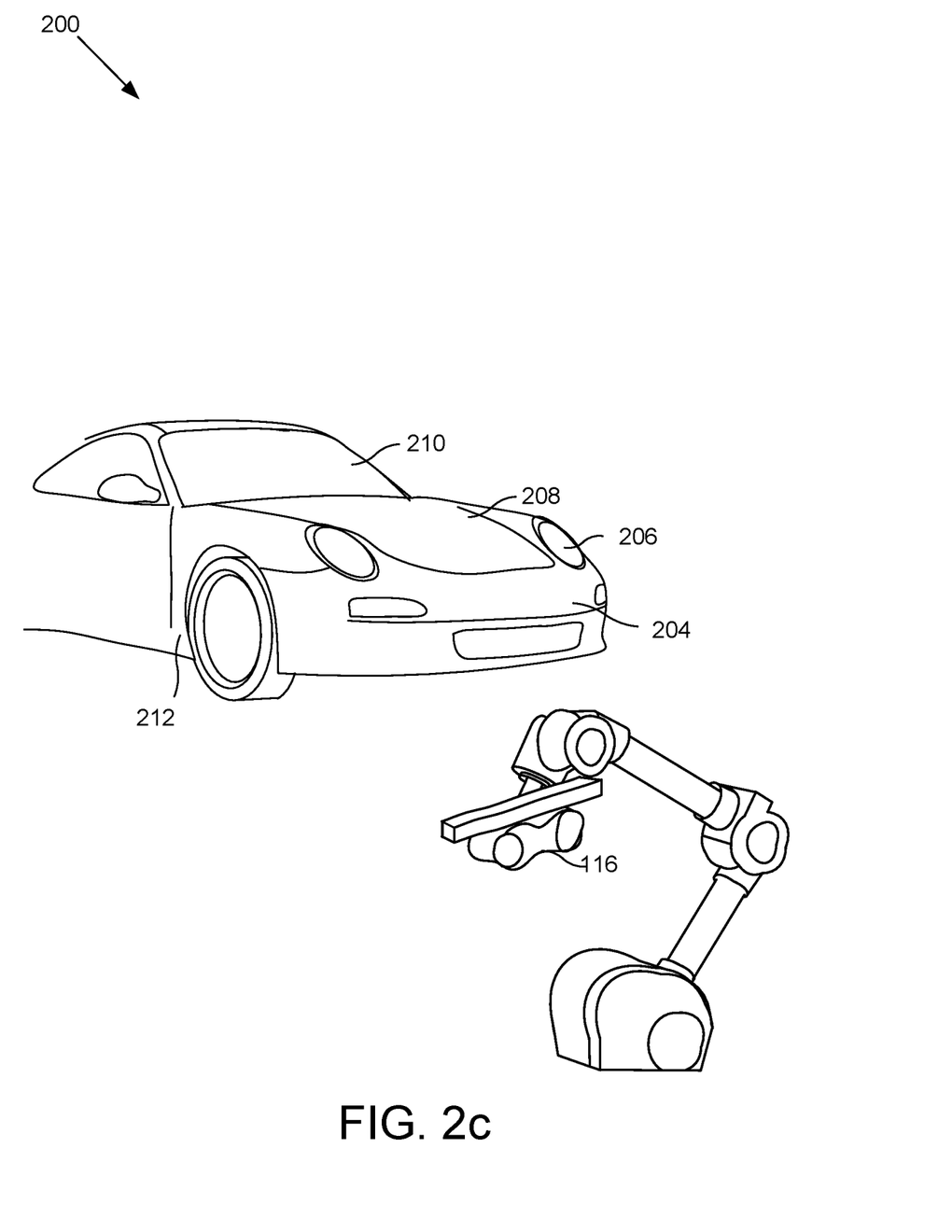
FIG. 2c is a perspective view diagram illustrating another embodiment of the present invention.

FIG. 2c is a perspective view diagram illustrating another embodiment of the present invention. As described above with the handheld scanner, the car exterior may be scanned with a stationary scanner 116. As will be described below, the scanner 116 is configured to determine dimensions, boundary locations, and surface profiles of the exterior elements of the vehicle 200. The 3d scanner collects data on the shapes and dimensions of the exterior elements to construct a three dimensional model.

Figure 3:
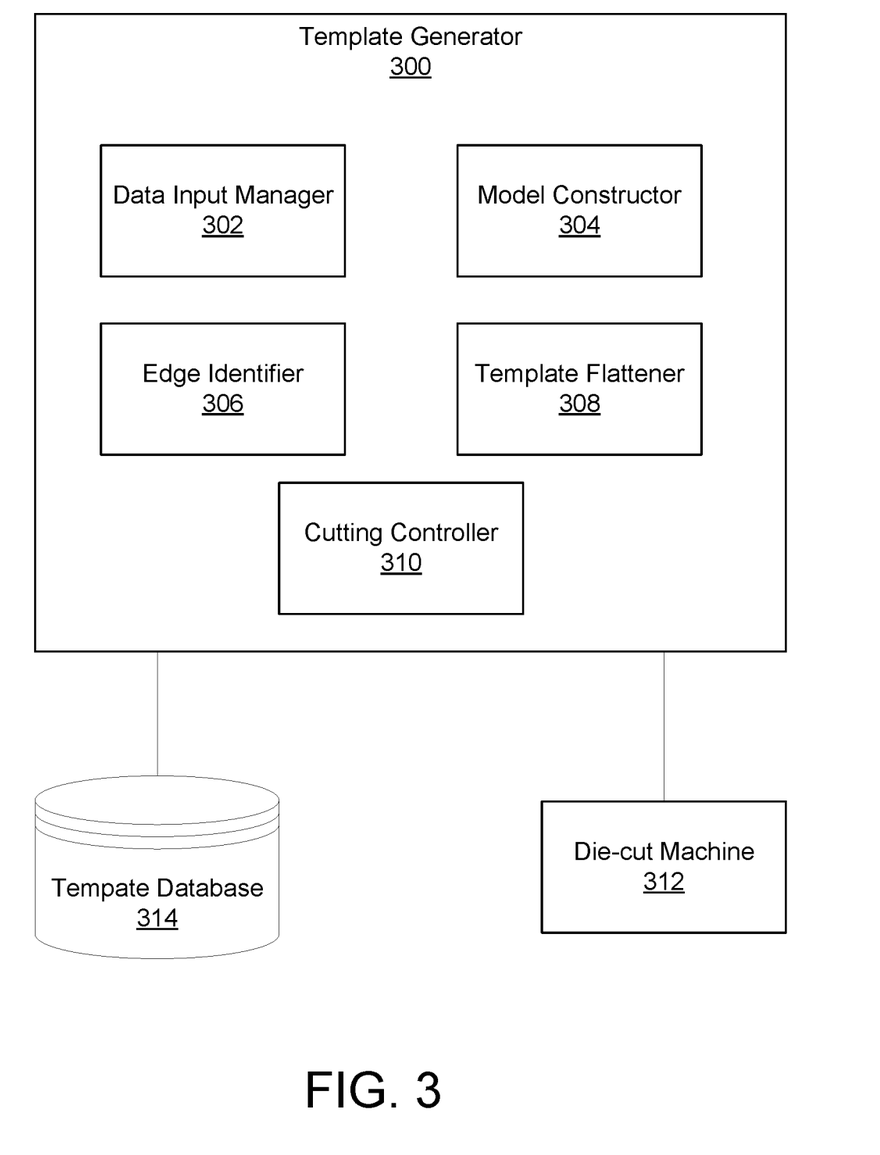
FIG. 3 is a block diagram illustrating one embodiment of a template generator in accordance with embodiments of the present disclosure.

FIG. 3 is a block diagram illustrating one embodiment of a template generator 300 in accordance with embodiments of the present disclosure. The template generator 300 is configured to receive data input based on the surface profile of the vehicle interior or exterior, construct a surface model based on the input, identify edges and boundaries of panels in the a vehicle, flatten the model in preparation for die-plotting, and cut a two-dimensional protective film based on the flattened model. To accomplish this, the template generator 300 includes, in one embodiment, a data input manager 302, a model constructor 304, an edge identifier 306, a template flattener 308, and a cutting controller 310.

The data input manager 302 is configured to receive data points indicative of the panels 106-112 of the vehicle interior or exterior. The data points may be representative of individual "time-of-flight" values captured while 3d laser scanning using the hand-held scanner 202 of FIG. 2. In another embodiment, the data input manager 302 is configured to receive dimensions and profile information for the panels 106-112 from a manufacturer of the panels. For example, the data input manager 302 may be configured to receive dimension and profile information in the form of a CAD file. In another embodiment, the data input manager is configured to receive data input in the form of dimensions received through a user interface from a user that has taken measurements of the panels 106-112.

The model constructor 304 is configured, in one embodiment, to generate a solid surface model of the panels from the data received by the data input manager 302. The model constructor 304 may be configured to take the data input (e.g., data in the form of a point cloud, or a group of points that together form a shape), and extrapolate the solid surface of the data input. The solid surface model may be formed as a polygon mesh model, a solid surface model, a point cloud model, a parametric model, a polymesh model, a nurb model or a solid CAD model. The model constructor 304, in one example, is implemented as a component of the template generator 300. Alternatively, the model constructor 304 may be a standalone application that imports data from and returns a solid surface model to the template generator. In one embodiment, a program such as Geomagic (by 3D Systems of Morrisville, N.C.) is used to mesh the dot clouds into a solid surface, which can be edited for any errors or blemishes.

In one embodiment, the edge identifier 306 is configured to identify an edge or boundary 114 between adjacent panels. The edge identifier 306 identifies the transition from a substantially planar surface of the panel to a curved boundary 114. The curved boundary may have a radius that forms an arc (e.g., a segment of the panel that is curved), or alternatively, the boundary may be formed of adjacent panels with substantially angular edges. In either situation, the edge identifier 306 identifies the transition from substantially planar surface to curved or angular boundary 114. The edge identifier 306, beneficially, determines the proper termination point of the protective film to prevent "lift off." Lift off occurs when the protective film wraps around a curve or edge having a small radius. The transition from planar to curved will be discussed in greater detail below with reference to FIGS. 4a-4c.

The template flattener 308 is configured to convert a three-dimensional template into a two-dimensional template. The template generator 300 first generates a three-dimensional template based upon the solid surface template created by the model constructor 304 together with the identified edges from the edge identifier 306. The template flattener 308 converts or "flattens" the three-dimensional template into a two-dimensional template. The template flattener 308 may be integrated into the template generator 300, or alternatively, the template flattener 308 may be a standalone program. One example of a standalone program suitable for use in the present disclosure is ExactFlat, by Tri-D Technologies of Toronto, Canada.

In one embodiment, the template flattener 30, such as the ExactFlat software is plug in to a design program Solid-Works, which is provided by Dassault Systemes Solidworks Corp. Of Waltham, Mass. Once the flattened software is imported into the design software, it can be edited if necessary. For instance, the flattening software may identify relief cuts to be made where the protective film will not stretch sufficiently.

The cutting controller 310, in one embodiment, is configured to control a die-cut, or cutting plotter, machine 312. The die-cut machine receives instructions from the cutting controller 310 and cuts a two-dimensional pattern on a sheet of protective film. The two-dimensional pattern, for example, is based on the two-dimensional template generated by the template flattener 308. The cutting controller 310 converts the two-dimensional template into instructions for cutting the two-dimensional pattern in the sheet of protective film.

The template generator 300, in one embodiment, is configured to store vehicle specific templates in the template database 314. The template database 314 may be implemented as part of the template generator 300, or alternatively, as a data store accessible over a network or computer bus, as will be described with reference to FIG. 6.

Figure 4A:
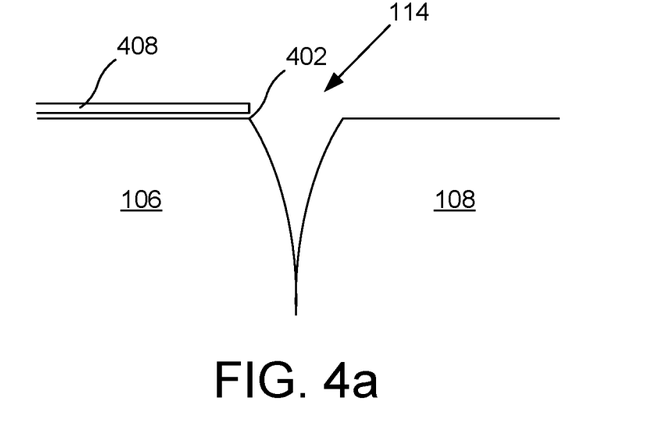
FIGS. 4a, 4b, and 4c collectively illustrate embodiments of transitions from substantially planar surfaces to edges of vehicle interior or exterior panels.
Figure 4B:
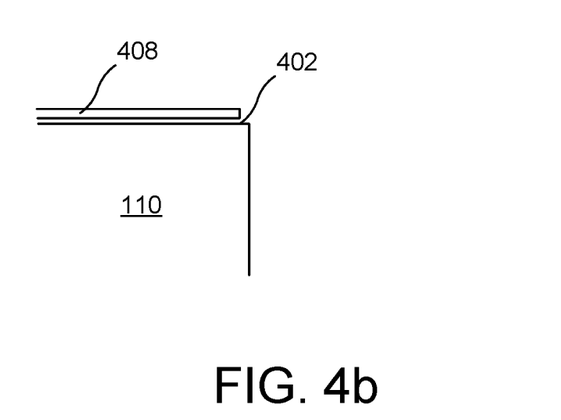
Figure 4C:
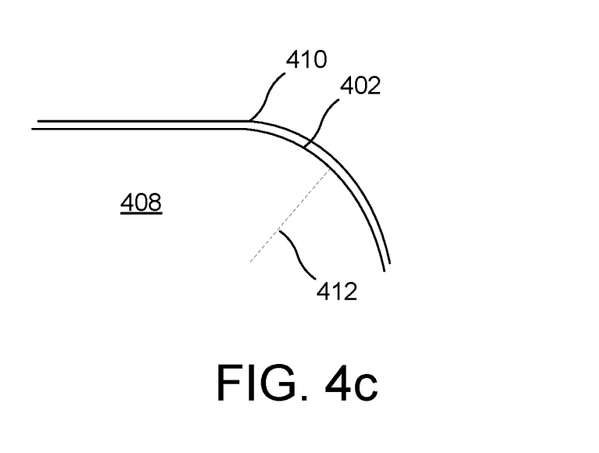

FIGS. 4a, 4b, and 4c collectively illustrate embodiments of transitions from substantially planar surfaces to edges of vehicle interior or exterior panels. The embodiments depicted illustrate examples of possible transition points 402, 404, 406. In general, the template generator 300 of FIG. 3 identifies the transition point 402, 404, 406 by analyzing the surfaces of the panels 106-112 and identifying the point at which the panel transitions from a substantially planar surface to a boundary 114. The boundary 114 may be curved, as illustrated in FIG. 4a, or alternatively, abrupt as in FIG. 4b. Regardless, the edge identifier 306 is configured to identify the transition point 402. The transition point 402 is the point at which the protective film 408 is terminated to prevent the above mentioned "lift off." The transition point 402 may be located at an edge, or adjacent an edge as depicted in FIG. 4b. However, in an alternative embodiment, the edge identifier 306 may be configured to identify a transition point 402 that causes the protective film 408 to partially wrap around a corner or curve. In another embodiment, the transition point 402 may be selected to cause the protective film to extend beyond the visible surfaces. In other words, the protective film may be configured to wrap around from the covered surface to an opposite surface. In one example, the protective film may wrap from one side of a hood, to the underside of the hood.

Further, FIG. 4c depicts one embodiment of an interior corner. The protective film 408 may be sized to terminate at a point 402 that is adjacent the edge 410. In another embodiment, relief cuts 412 may be disposed within curved or interior corners to allow for the protective film 408 to fit properly. The relief cut 412 is depicted as a dashed line because, in one embodiment, the relief cut 412 is a mostly not visible to the casual observer. The phrase "relief cut" refers to a cut in the protective film that removes excess material.

Figure 5:
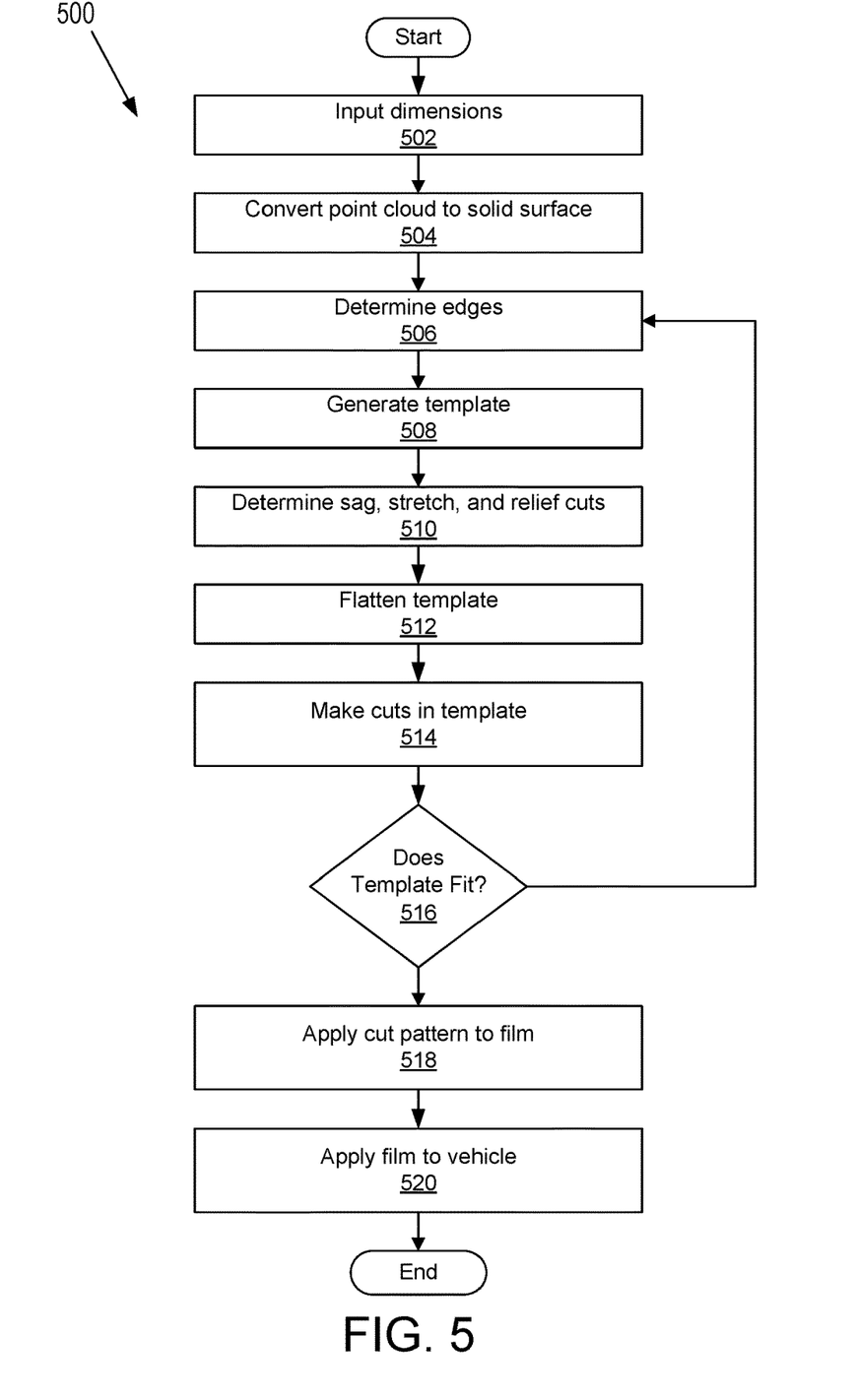
FIG. 5 illustrates a flow diagram of one embodiment of a method for generating a template.

FIG. 5 illustrates a flow diagram of one embodiment of a method 500 for generating a template. The method is performed by processing logic that may comprise hardware (circuitry, dedicated logic, etc.), software (such as is run on a general purpose computer system or a dedicated machine), or a combination of both. In one embodiment, the method is performed by a template generator (e.g., template generator 300 of FIG. 3).

The method 500 starts, and the processing logic, at block 502, receives dimension input. In one embodiment, the processing logic receives input by performing a three-dimensional scan of a vehicle interior or exterior. The three-dimensional scan may be performed by a hand-held scanner, or alternatively, a fixed or moveable scanner as described above with reference to FIGS. 1 and 2. In another embodiment, the processing logic receives data input by retrieving a vehicle profile from a database, such as database 314 of FIG. 3. In another embodiment, the processing logic receives data input from a vehicle manufacturer, or, receives manual measurements taken by a user.

If the data input is received from a scanner, at block 504 the processing logic converts a point cloud to a solid surface. The point cloud is a set of data points in a coordinate system created by a scanner (e.g., hand-held scanner, fixed scanner, moveable scanner). The processing logic converts the point cloud to a solid surface by generating, for example, a polygon mesh, a triangle mesh, NURBS surface model, or a CAD model.

At block 506, the processing logic determines the edges of the three-dimensional template. The edges of the three-dimensional template correspond to the transition points described above with reference to FIGS. 4a, 4b, and 4c. By creating a template for the protective film that terminates at a transition point, lift-off of the protective film is prevented. As described above, the determined edges may be positioned on or adjacent to the transition point. In other words, the protective film may stop short of an edge, or wrap around an edge.

At block 508, the processing logic generates the template, and then at block 510 determines the sag stretch, and relief cuts. At block 512, the processing logic flattens the template. The processing logic then controls a die-cut machine, in one embodiment, to cut the template at block 514. The template may be cut in a sheet of plastic that is later applied or transferred to the protective film, or the template may be cut directly from a sheet of the protective film.

At decision block 516, the processing logic determines if the template fits an intended panel of the vehicle. If the determination is positive, the processing logic, at block 518, applies the cut template pattern to the protective film. The protective film then, at block 520, is applied to the vehicle and the method 500 ends. The protective film, which is formed with an adhesive on one side of the film, is then applied to the panels of the vehicle interior or exterior to protect and rejuvenate the panels. If the determination, however, is negative, the processing logic returns to block 506 to modify the edges.

Figure 6:
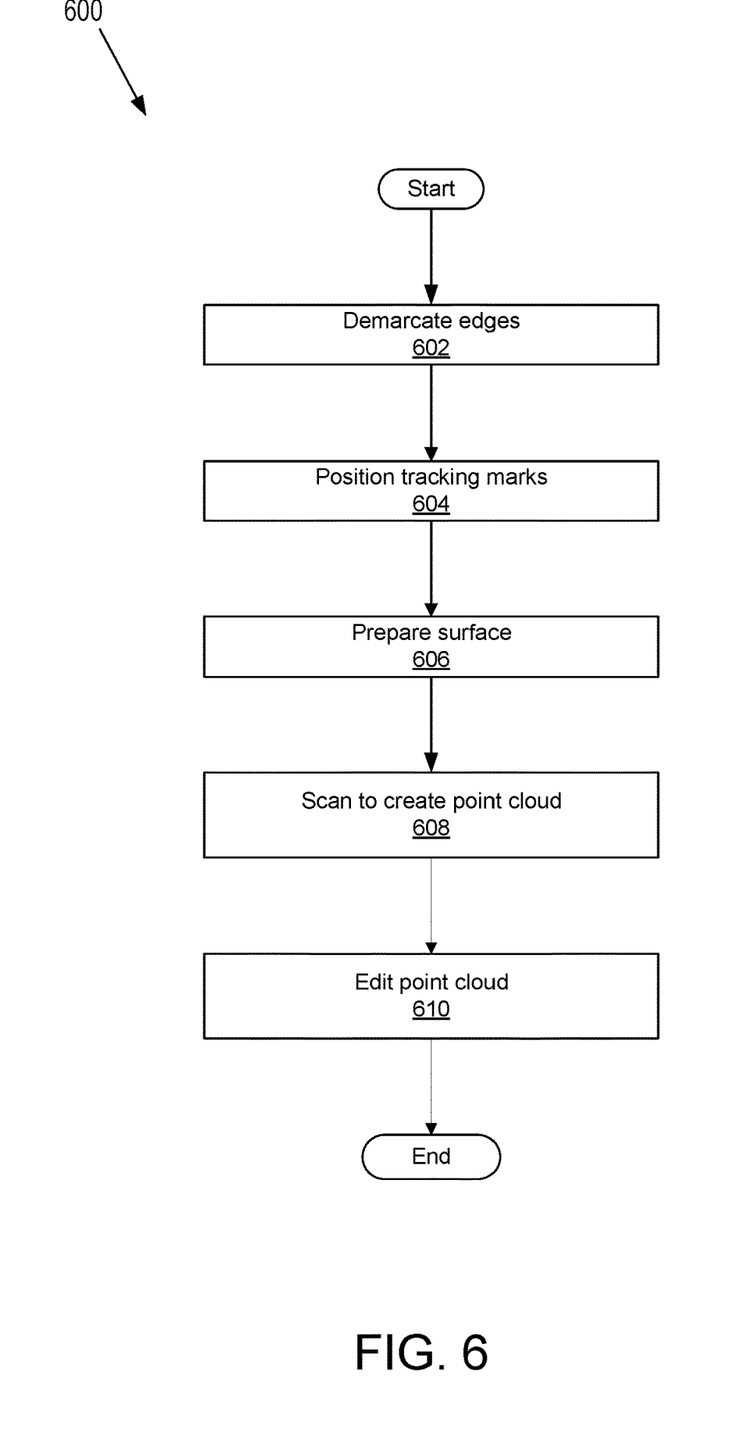
FIG. 6 illustrates a flow diagram of one embodiment of a method for preparing a surface.

FIG. 6 illustrates a flow diagram of one embodiment of a method 600 for preparing a surface. In one embodiment, the method starts and edges are demarcated 602. For example, vent openings, input openings, plugs, etc., may be masked with masking tape, or any other suitable masking agent. In other examples, the edges between panels and openings may be distinguished with, for example, a distinctive material such as tape or, a reflective material. Additionally, any surface that is not receiving the protective film may be covered or masked.

The method 600 continues, and tracking marks may be positioned 604 across the surface. The tracking marks are positioned to enable the scanner to determine a position and dimension scale (i.e., 1 pixel=$\frac{1}{300}$ inch).

At block 606, the surface is prepared for scanning. In one embodiment, preparing the surface for scanning comprises applying a dust or powder to surfaces that may be overly reflective of the scanner laser. In an alternative embodiment, preparing the surface comprises applying a wax, or other film to either enhance or reduce the reflectivity of the surface. In other embodiments, preparing the surface comprises taping or masking control panels or other buttons.

At block 608, the scanner scans the surface to create a point cloud as described above. At block 610, the point cloud may be edited. In one example, editing the point cloud includes merging all of the individual scans into a single point cloud. In other embodiments, editing the point cloud refers to cleaning up outlier data points. The method 600 then ends.

Figure 7:
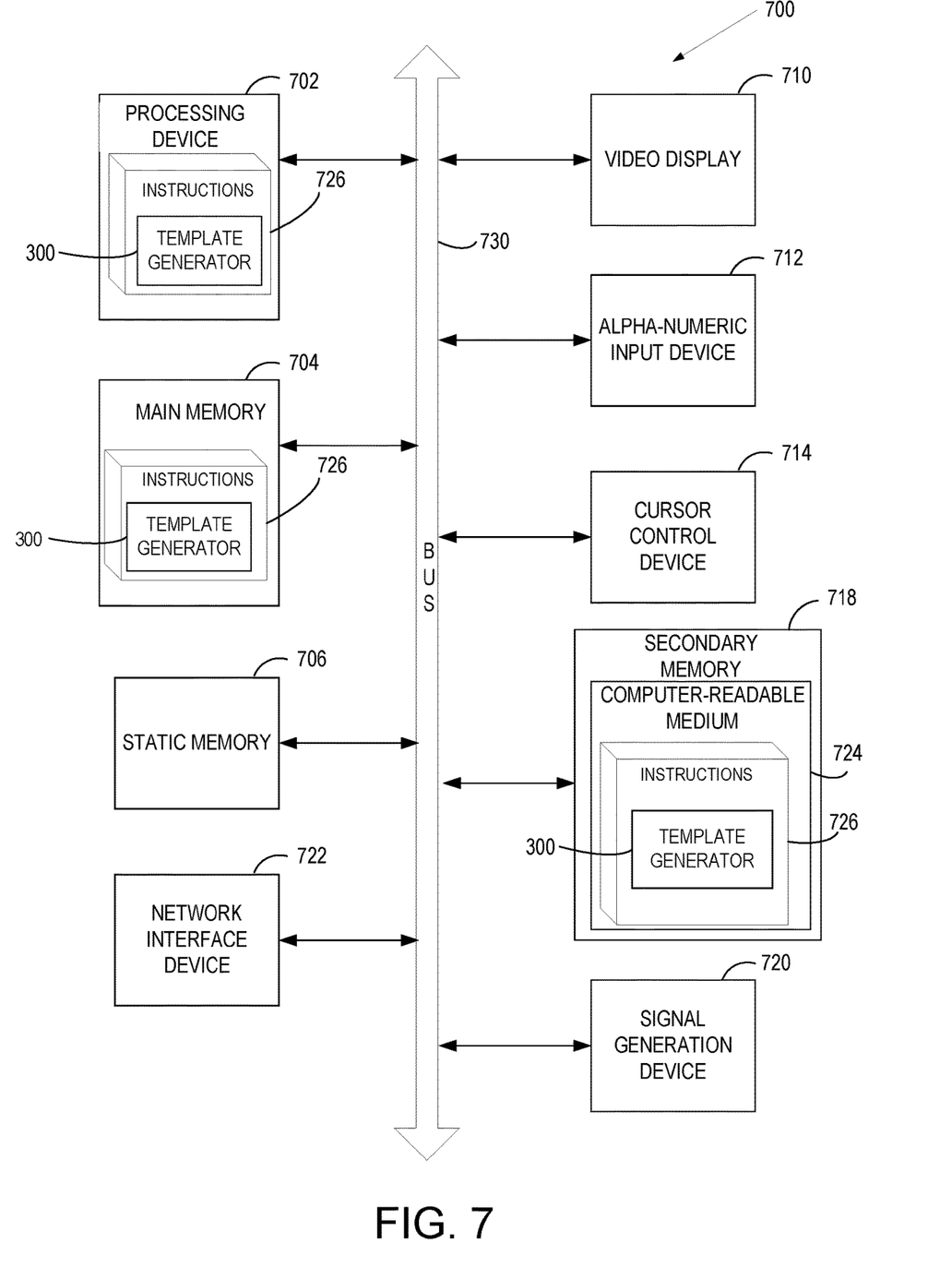
FIG. 7 is a diagram of one embodiment of a computer system for facilitating template generation.

FIG. 7 is a diagram of one embodiment of a computer system for facilitating template generation. Within the computer system 700 is a set of instructions for causing the machine to perform any one or more of the methodologies discussed herein. In alternative embodiments, the machine may be connected (e.g., networked) to other machines in a LAN, an intranet, an extranet, or the Internet. The machine may be a host in a cloud, a cloud provider system, a cloud controller or any other machine. The machine may operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM) or DRAM (RDRAM), etc.), a static memory 706 (e.g., flash memory, static random access memory (SRAM), etc.), and a secondary memory 718 (e.g., a data storage device in the form of a drive unit, which may include fixed or removable computer-readable storage medium), which communicate with each other via a bus 730.

The processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute the instructions 726 for performing the operations and steps discussed herein.

The computer system 700 may further include a network interface device 722. The computer system 700 also may include a video display unit 710 (e.g., a liquid crystal display (LCD) or a cathode ray tube (CRT)) connected to the computer system through a graphics port and graphics chipset, an alphanumeric input device 712 (e.g., a keyboard), a cursor control device 714 (e.g., a mouse), and a signal generation device 720 (e.g., a speaker).

The secondary memory 718 may include a machine-readable storage medium (or more specifically a computer-readable storage medium) 724 on which is stored one or more sets of instructions 726 embodying any one or more of the methodologies or functions described herein. In one embodiment, the instructions 726 include instructions for the template generator 300. The instructions 726 may also reside, completely or at least partially, within the main memory 704 and/or within the processing device 702 during execution thereof by the computer system 700. The main memory 704 and the processing device 702 also constituting machine-readable storage media.

The computer-readable storage medium 724 may also be used to store the instructions 726 persistently. While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 726, components and other features described herein can be implemented as discrete hardware components or integrated in the functionality of hardware components such as ASICS, FPGAs, DSPs or similar devices. In addition, the instructions 726 can be implemented as firmware or functional circuitry within hardware devices. Further, the instructions 726 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "providing," "generating," "detecting," "identifying," "storing," "retrieving," "identifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

In the preceding description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment. Like reference numbers signify like elements throughout the description of the figures.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
    determining an image scanning position of a three-dimensional image scanner;
    receiving, at one or more image analysis applications and from the three-dimensional image scanner, dimensions of a first vehicle panel, wherein the three-dimensional image scanner detects the dimensions of the first vehicle panel, and the three-dimensional image scanner determines the dimensions of a first vehicle relative to the image scanning position of the three-dimensional image scanner;
    receiving, at the one or more image analysis applications and from the three-dimensional image scanner, surface profiles of the first vehicle panel, wherein the three-dimensional image scanner detects the surface profiles of the first vehicle panel, and the three-dimensional image scanner determines the surface profiles of the first vehicle relative to the image scanning position of the three-dimensional image scanner;
    constructing, using the one or more image analysis applications, a three-dimensional model of the first vehicle panel using the dimensions and the surface profiles of the first vehicle panel and based on the image scanning position of the three-dimensional image scanner;
    determining, using the one or more image analysis applications, a transition point between a planar surface and an edge of the first vehicle panel using the three-dimensional model, wherein the edge comprises a curved or angular boundary;
    determining, using the one or more image analysis applications, a termination point based on the transition point and the edge, wherein the termination point is determined to inhibit a sheet of protective film from lifting off a visible surface of the first vehicle panel;
    determining, using the one or more image analysis applications, a plurality of relief cuts corresponding to the first vehicle panel using the transition point, the termination point, and the three-dimensional model, wherein the plurality of relief cuts comprise one or more first cuts to the sheet of protective film at locations where the sheet of protective film will not properly fit the first vehicle panel and one or more second cuts to the sheet of protective film to remove excess material;
    generating, using the one or more image analysis applications, a protective film template for the first vehicle panel based on the dimensions of the first vehicle panel, the determined transition point, the determined termination point, and the plurality of relief cuts, wherein generating the protective film template comprises converting a three-dimensional protective film template into a two-dimensional protective film template by flattening the protective film template; and
    applying, using the one or more image analysis applications, the protective film template to the sheet of protective film, wherein the sheet of protective film comprises an adhesive, the sheet of protective film is used to modify the appearance of the first vehicle panel by modifying how light reflects off scratches on the first vehicle panel, and the protective film is shaped to cover less than the entire surface of the first vehicle panel so that there is a portion of the surface of the first vehicle panel near the edge of the first vehicle panel that is not covered by the protective film.

2. The method of claim 1, further comprising storing, using the one or more image analysis applications, the two-dimensional template on a storage device.

3. The method of claim 1, further comprising converting, using the one or more image analysis applications, the two-dimensional template into instructions for cutting a two-dimensional pattern in the protective film.

4. The method of claim 1, further comprising instructing, using the one or more image analysis applications, a die-cut machine to cut the protective film according to the protective film template.

5. The method of claim 1, wherein receiving the dimensions further comprises three-dimensional laser scanning the first vehicle panel.

6. The method of claim 1, further comprising adhering the protective film to the first vehicle panel via the adhesive.

7. The method of claim 1, wherein constructing the three-dimensional model comprises extrapolating a solid surface using the dimensions and the surface profiles of the first vehicle panel.

8. A system comprising at least one computing device and at least one program module that are together configured to perform actions comprising:
    determining an image scanning position of a three-dimensional image scanner;
    receiving, at one or more image analysis applications and from the three-dimensional image scanner, dimensions of a first vehicle panel, wherein the three-dimensional image scanner detects the dimensions of the first vehicle panel, and the three-dimensional image scanner determines the dimensions of a first vehicle relative to the image scanning position of the three-dimensional image scanner;
    receiving, at the one or more image analysis applications and from the three-dimensional image scanner, surface profiles of the first vehicle panel, wherein the three-dimensional image scanner detects the surface profiles of the first vehicle panel, and the three-dimensional image scanner determines the surface profiles of the first vehicle relative to the image scanning position of the three-dimensional image scanner;
    constructing, using the one or more image analysis applications, a three-dimensional model of the first vehicle panel using the dimensions and the surface profiles of the first vehicle panel and based on the image scanning position of the three-dimensional image scanner;
    determining, using the one or more image analysis applications, a transition point between a planar surface and an edge of the first vehicle panel using the three-dimensional model, wherein the edge comprises a curved or angular boundary;
    determining, using the one or more image analysis applications, a termination point based on the transition point and the edge, wherein the termination point is determined to inhibit a sheet of protective film from lifting off a visible surface of the first vehicle panel;

determining, using the one or more image analysis applications, a plurality of relief cuts corresponding to the first vehicle panel using the transition point, the termination point, and the three-dimensional model, wherein the plurality of relief cuts comprise one or more first cuts to the sheet of protective film at locations where the sheet of protective film will not properly fit the first vehicle panel and one or more second cuts to the sheet of protective film to remove excess material;

generating, using the one or more image analysis applications, a protective film template for the first vehicle panel based on the dimensions of the first vehicle panel, the determined transition point, the determined termination point, and the plurality of relief cuts, wherein generating the protective film template comprises converting a three-dimensional protective film template into a two-dimensional protective film template by flattening the protective film template; and transferring, using the one or more image analysis applications, the protective film template to the sheet of protective film, wherein the sheet of protective film comprises an adhesive, the sheet of protective film is used to modify the appearance of the first vehicle panel by modifying how light reflects off scratches on the first vehicle panel, and the protective film is shaped to cover less than the entire surface of the first vehicle panel so that there is a portion of the surface of the first vehicle panel near the edge of the first vehicle panel that is not covered by the protective film.

9. The system of claim 8, wherein the at least one computing device and the at least one program module are together configured to perform storing, using the one or more image analysis applications, the two-dimensional template on a storage device.

10. The system of claim 8, wherein the at least one computing device and the at least one program module are together configured to convert, using the one or more image analysis applications, the two-dimensional template into instructions for cutting a two-dimensional pattern in the protective film.

11. The system of claim 8, wherein the at least one computing device and the at least one program module are together configured to instruct, using the one or more image analysis applications, a die-cut machine to cut the protective film according to the protective film template.

12. The system of claim 8, wherein receiving the dimensions further comprises three-dimensional laser scanning the first vehicle panel.

13. The system of claim 8, wherein the at least one computing device and the at least one program module are together configured to adhere the protective film to the first vehicle panel via the adhesive.

14. The system of claim 8, wherein constructing the three-dimensional model comprises extrapolating a solid surface using the dimensions and the surface profiles of the first vehicle panel.

15. A non-transitory computer-readable storage device storing computer-executable instructions that, when executed by a second device, cause the second device to perform actions comprising:

determining an image scanning position of a three-dimensional image scanner;

receiving, at one or more image analysis applications and from the three-dimensional image scanner, dimensions of a first vehicle panel, wherein the three-dimensional image scanner detects the dimensions of the first vehicle panel, and the three-dimensional image scanner determines the dimensions of a first vehicle relative to the image scanning position of the three-dimensional image scanner;

receiving, at the one or more image analysis applications and from the three-dimensional image scanner, surface profiles of the first vehicle panel, wherein the three-dimensional image scanner detects the surface profiles of the first vehicle panel, and the three-dimensional image scanner determines the surface profiles of the first vehicle relative to the image scanning position of the three-dimensional image scanner;

constructing, using the one or more image analysis applications, a three-dimensional model of the first vehicle panel using the dimensions and the surface profiles of the first vehicle panel and based on the image scanning position of the three-dimensional image scanner;

determining, using the one or more image analysis applications, a transition point between a planar surface and an edge of the first vehicle panel using the three-dimensional model, wherein the edge comprises a curved or angular boundary;

determining, using the one or more image analysis applications, a termination point based on the transition point and the edge, wherein the termination point is determined to inhibit a sheet of protective film from lifting off a visible surface of the first vehicle panel;

determining, using the one or more image analysis applications, a plurality of relief cuts corresponding to the first vehicle panel using the transition point, the termination point, and the three-dimensional model, wherein the plurality of relief cuts comprise one or more first cuts to the sheet of protective film at locations where the sheet of protective film will not properly fit the first vehicle panel and one or more second cuts to the sheet of protective film to remove excess material;

generating, using the one or more image analysis applications, a protective film template for the first vehicle panel based on the dimensions of the first vehicle panel, the determined transition point, the determined termination point, and the plurality of relief cuts, wherein generating the protective film template comprises converting a three-dimensional protective film template into a two-dimensional protective film template by flattening the protective film template; and transferring, using the one or more image analysis applications, the protective film template to the sheet of protective film, wherein the sheet of protective film comprises an adhesive, the sheet of protective film is used to modify the appearance of the first vehicle panel by modifying how light reflects off scratches on the first vehicle panel, and the protective film is shaped to cover less than the entire surface of the first vehicle panel so that there is a portion of the surface of the first vehicle panel near the edge of the first vehicle panel that is not covered by the protective film.

16. The non-transitory computer-readable storage device of claim 15, wherein the non-transitory computer-readable storage device stores computer-executable instructions that cause the second device to perform storing, using the one or more image analysis applications, the two-dimensional template on a storage device.

17. The non-transitory computer-readable storage device of claim 15, wherein the non-transitory computer-readable storage device stores computer-executable instructions that cause the second device to convert, using the one or more image analysis applications, the two-dimensional template into instructions for cutting a two-dimensional pattern in the protective film.

18. The non-transitory computer-readable storage device of claim 15, wherein the non-transitory computer-readable storage device stores computer-executable instructions that cause the second device to instruct, using the one or more image analysis applications, a die-cut machine to cut the protective film according to the protective film template.

19. The non-transitory computer-readable storage device of claim 15, wherein receiving the dimensions further comprises three-dimensional laser scanning the first vehicle panel.

20. The non-transitory computer-readable storage device of claim 15, wherein constructing the three-dimensional model comprises extrapolating a solid surface using the dimensions and the surface profiles of the first vehicle panel.

\* \* \* \* \*